United States Patent
Chen et al.

(10) Patent No.: US 11,614,929 B2
(45) Date of Patent: Mar. 28, 2023

(54) IDENTITY REGISTRATION METHODS, APPARATUSES, AND DEVICES

(71) Applicant: ALIPAY (HANGZHOU) INFORMATION TECHNOLOGY CO., LTD., Zhejiang (CN)

(72) Inventors: Yuan Chen, Hangzhou (CN); Renhui Yang, Hangzhou (CN); Wenyu Yang, Hangzhou (CN); Qin Liu, Hangzhou (CN); Shubo Li, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/359,069

(22) Filed: Jun. 25, 2021

(65) Prior Publication Data
US 2022/0066762 A1     Mar. 3, 2022

(30) Foreign Application Priority Data
Aug. 28, 2020     (CN) ........................ 202010889206.X (51) Int. Cl.
G06F 9/44 (2018.01)
G06F 8/61 (2018.01)
G06F 21/62 (2013.01)

(52) U.S. Cl.
CPC .............. *G06F 8/61* (2013.01); *G06F 21/629* (2013.01)

(58) Field of Classification Search
CPC ................................. G06F 8/61; G06F 21/629
USPC .................................................. 717/168–178
See application file for complete search history.

(56) References Cited

U.S. PATENT DOCUMENTS

| 10,505,741 B1 | 12/2019 | Conley |
| 2015/0234646 A1 | 8/2015 | Schafer et al. |
| 2016/0134660 A1* | 5/2016 | Ponsini ............ H04L 63/20 726/1 |
| 2017/0277869 A1 | 9/2017 | Liu |
| 2018/0060496 A1 | 3/2018 | Bulleit et al. |
| 2018/0254898 A1 | 9/2018 | Sprague et al. |

(Continued)

FOREIGN PATENT DOCUMENTS

| CN | 1996955 | 7/2007 |
| CN | 103677935 | 3/2014 |
| CN | 104010044 | 8/2014 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Chuck O Kendall
(74) *Attorney, Agent, or Firm* — Fish & Richardson P.C.

(57) ABSTRACT

Embodiments of the present specification disclose identity registration methods, apparatuses, and devices. One method comprising: identifying description information from a user for a secure application configured to obtain trusted data to be installed; retrieving installation package data corresponding to the secure application based on the description information; installing the secure application in a trusted execution environment (TEE) based on the installation package data; and adding the description information to a digital identity document of the user recorded on a blockchain.

17 Claims, 5 Drawing Sheets

(56) References Cited

U.S. PATENT DOCUMENTS

2020/0356085 A1* 11/2020 Wentz .................. G06F 30/398

FOREIGN PATENT DOCUMENTS

| CN | 204360381 | 5/2015 |
| --- | --- | --- |
| CN | 105631322 | 6/2016 |
| CN | 106408486 | 2/2017 |
| CN | 107507091 | 12/2017 |
| CN | 107579979 | 1/2018 |
| CN | 107622385 | 1/2018 |
| CN | 107729745 | 2/2018 |
| CN | 107742189 | 2/2018 |
| CN | 107968709 | 4/2018 |
| CN | 108076011 | 5/2018 |
| CN | 108471350 | 8/2018 |
| CN | 108616539 | 10/2018 |
| CN | 108632284 | 10/2018 |
| CN | 108881160 | 11/2018 |
| CN | 108932297 | 12/2018 |
| CN | 108985089 | 12/2018 |
| CN | 109150607 | 1/2019 |
| CN | 109245893 | 1/2019 |
| CN | 109376504 | 2/2019 |
| CN | 109522722 | 3/2019 |
| CN | 109525400 | 3/2019 |
| CN | 109547500 | 3/2019 |
| CN | 109559105 | 4/2019 |
| CN | 109660358 | 4/2019 |
| CN | 109710270 | 5/2019 |
| CN | 109741039 | 5/2019 |
| CN | 109768865 | 5/2019 |
| CN | 109840436 | 6/2019 |
| CN | 109993490 | 7/2019 |
| CN | 110009232 | 7/2019 |
| CN | 110034924 | 7/2019 |
| CN | 110046165 | 7/2019 |
| CN | 110083610 | 8/2019 |
| CN | 110086804 | 8/2019 |
| CN | 110222533 | 9/2019 |
| CN | 110224837 | 9/2019 |
| CN | 110335149 | 10/2019 |
| CN | 110457875 | 11/2019 |
| CN | 110516178 | 11/2019 |
| CN | 110555292 | 12/2019 |
| CN | 110636062 | 12/2019 |
| CN | 110837658 | 2/2020 |
| CN | 110968743 | 4/2020 |
| CN | 110990804 | 4/2020 |
| CN | 111049660 | 4/2020 |
| CN | 111179067 | 5/2020 |
| CN | 111191268 | 5/2020 |
| CN | 111222157 | 6/2020 |
| CN | 111340627 | 6/2020 |
| CN | 111414599 | 7/2020 |
| CN | 111415157 | 7/2020 |
| CN | 111506662 | 8/2020 |
| CN | 111597565 | 8/2020 |
| CN | 111741036 | 10/2020 |
| WO | WO 2018164955 | 9/2018 |
| WO | WO 2019179535 | 5/2020 |

OTHER PUBLICATIONS

Nakamoto, "Bitcoin: A Peer-to-Peer Electronic Cash System," www.bitcoin.org, 2005, 9 pages.
U.S. Appl. No. 17/364,658, filed Jun. 30, 2021, Wenyu Yang.
U.S. Appl. No. 17/362,914, filed Jun. 29, 2021, Qin Liu.
U.S. Appl. No. 17/359,475, filed Jun. 25, 2021, Renhui Yang.
U.S. Appl. No. 17/358,249, filed Jun. 25, 2021, Shubo Li.
U.S. Appl. No. 17/359,487, filed Jun. 25, 2021, Renhui Yang.
U.S. Appl. No. 17/348,975, filed Jun. 16, 2021, Renhui Yang.
U.S. Appl. No. 17/364,602, filed Jun. 30, 2021, Renhui Yang.
U.S. Appl. No. 17/349,764, filed Jun. 16, 2021, Qin Liu.
U.S. Appl. No. 17/359,219, filed Jun. 25, 2021, Yuan Chen.
U.S. Appl. No. 17/359,476, filed Jun. 25, 2021, Wenyu Yang.
Extended European Search Report in European Application No. 21182623.5, dated Dec. 23, 2021, 9 pages.
Msgna et al., "Secure Application Execution in Mobile Devices," Advances in Biometrics: International Conference, Mar. 18, 2016, pp. 417-438.

* cited by examiner

IDENTITY REGISTRATION METHODS, APPARATUSES, AND DEVICES

CROSS-REFERENCE TO RELATED APPLICATIONS FIELD

This application claims priority to Chinese Patent Application No. 202010889206.X, filed on Aug. 28, 2020, which is hereby incorporated by reference in its entirety.

TECHNICAL FIELD

The present application relates to the field of computer technologies, and in particular, to identity registration methods, apparatuses, and devices.

BACKGROUND

For data on the Internet, to determine whether data content is trusted, a data provider digitally signs the data to ensure the authenticity of the data in the existing technology. However, in this method that the data provider performs data signature, an additional operation is added to normal operations of the data provider, which may impose great burden on a data provider that needs to provide a large amount of data. In addition, providing data by using the existing method can prove only a trusted data source, but data may be tampered with in a data transmission process, causing untrusted obtained data content.

SUMMARY

Embodiments of the present specification provide identity registration methods and apparatuses, to resolve a problem that data content is not highly trusted in the existing trusted data acquisition method.

To resolve the technical problem, the embodiments of the present specification are implemented as follows:

According to a first aspect, embodiments of the present specification provide an identity registration method, including: description information submitted by a user for a secure application to be installed is obtained, where the secure application is a program used to obtain trusted data; installation package data corresponding to the secure application is retrieved based on the description information; the secure application is installed in a trusted execution environment based on the installation package data; and the description information is added to a digital identity document of the user in a blockchain network.

According to a second aspect, embodiments of the present specification provide an identity registration apparatus, including: a description information acquisition module, configured to obtain description information submitted by a user for a secure application to be installed, where the secure application is a program used to obtain trusted data; an installation package data retrieval module, configured to retrieve installation package data corresponding to the secure application based on the description information; a secure application installation module, configured to install the secure application in a trusted execution environment based on the installation package data; and a description information adding module, configured to add the description information to a digital identity document of the user in a blockchain network.

According to a third aspect, embodiments of the present specification provide an identity registration device, including: at least one processor; and a memory communicably coupled to the at least one processor.

The memory stores instructions that can be executed by the at least one processor, and the instructions are executed by the at least one processor to enable the at least one processor to: obtain description information submitted by a user for a secure application to be installed, where the secure application is a program used to obtain trusted data; retrieve installation package data corresponding to the secure application based on the description information; install the secure application in a trusted execution environment based on the installation package data; and add the description information to a digital identity document of the user in a blockchain network.

According to a fourth aspect, embodiments of the present specification provide a computer-readable medium. The computer-readable medium stores computer-readable instructions, and the computer-readable instructions can be executed by a processor to implement the previously described identity registration method.

An embodiment of the present specification can be implemented to achieve the following beneficial effects: By restricting the applications used by registered users, the user can use only an application that satisfies a predetermined source channel to obtain data provided by a data provider and a secure application can run only in a trusted execution environment. Therefore, a secure data retrieval environment can be provided, to ensure that both data acquisition and data transmission are secure and trusted, thereby improving trustworthiness of obtained data content.

BRIEF DESCRIPTION OF DRAWINGS

To describe technical solutions in the embodiments of the present specification or in the existing technology more clearly, the following briefly describes the accompanying drawings needed for describing the embodiments or the existing technology. Clearly, the accompanying drawings in the following description show merely some embodiments of the present specification, and a person of ordinary skill in the art can still derive other drawings from these accompanying drawings without creative efforts.

DESCRIPTION OF EMBODIMENTS

To make the objectives, technical solutions, and advantages of the one or more embodiments of the present specification clearer, the following clearly and comprehensively describes the technical solutions of the one or more embodiments of the present specification with reference to specific embodiments of the present specification and corresponding accompanying drawings. Clearly, the described embodiments are merely some but not all of the embodiments of the present specification. All other embodiments obtained by a person of ordinary skill in the art based on the embodiments of the present specification without creative efforts shall fall within the protection scope of the one or more embodiments of the present specification.

The technical solutions provided in the embodiments of the present specification are described in detail below with reference to the accompanying drawings.

In the existing technology, if an individual or an institution needs to apply to bank A for a loan, bank A often requires the borrower to provide corresponding materials, such as a personal credit report, a personal salary certificate, real estate information, and an enterprise business status. A personal salary statement is used as an example. If a bank corresponding to the salary statement is bank B, the borrower needs to go to bank B to print the salary statement, and then submit the salary statement to bank A. This process often needs a lot of time and energy of the user. Therefore, if bank A can directly communicate with bank B to obtain the salary statement of the borrower, the borrower spent time can be greatly saved, and efficiency of bank A can also be improved.

However, if bank A directly communicates with bank B, data trustworthiness needs to be ensured. In the existing technology, bank B often seals or digitally signs provided data to prove data trustworthiness. In a common implementation, bank A and bank B reside in the same blockchain, and then bank B processes data through digital signature (for example, processes the data and encrypts a public key by using a hash algorithm), and then sends processed data to bank A. However, this process adds additional burden to normal operations of bank B. In addition, it cannot be ensured that a data transmission process is fully trusted. If a vulnerable program or APP is installed in a terminal, data may be tampered with or leaked. Therefore, a security vulnerability and a resource waste exist in this data transmission method in the existing technology.

To resolve the problems, the present solutions provide an identity registration platform for identity registration methods for organizations or institutions such as banks, real estate centers, public security bureaus, and welfare houses. For example, when performing registration, bank A installs some secure applications related to a service. These secure applications can be used to obtain original data from bank B, or perform some processing on the original data. However, these secure applications run in a trusted execution environment provided by the platform, instead of running on a certain server or terminal of bank A. In addition, processing logic, a data source, etc. of each secure application are public, for each user on the platform to view. These secure applications are permanently stored in a certain device, and can only be accessed and cannot be tampered with, thereby ensuring trustworthiness of the secure applications. As such, each user can determine a specific acquisition method of obtained data and whether the obtained data complies with the regulations based on names of the secure applications.

By restricting the applications used by registered users, the user can use only an application that satisfies a predetermined source channel to obtain data provided by a data provider and a secure application can run only in a trusted execution environment. Therefore, a secure data retrieval environment can be provided, to ensure that both data acquisition and data transmission are secure and trusted, thereby improving trustworthiness of obtained data content.

Figure 1:
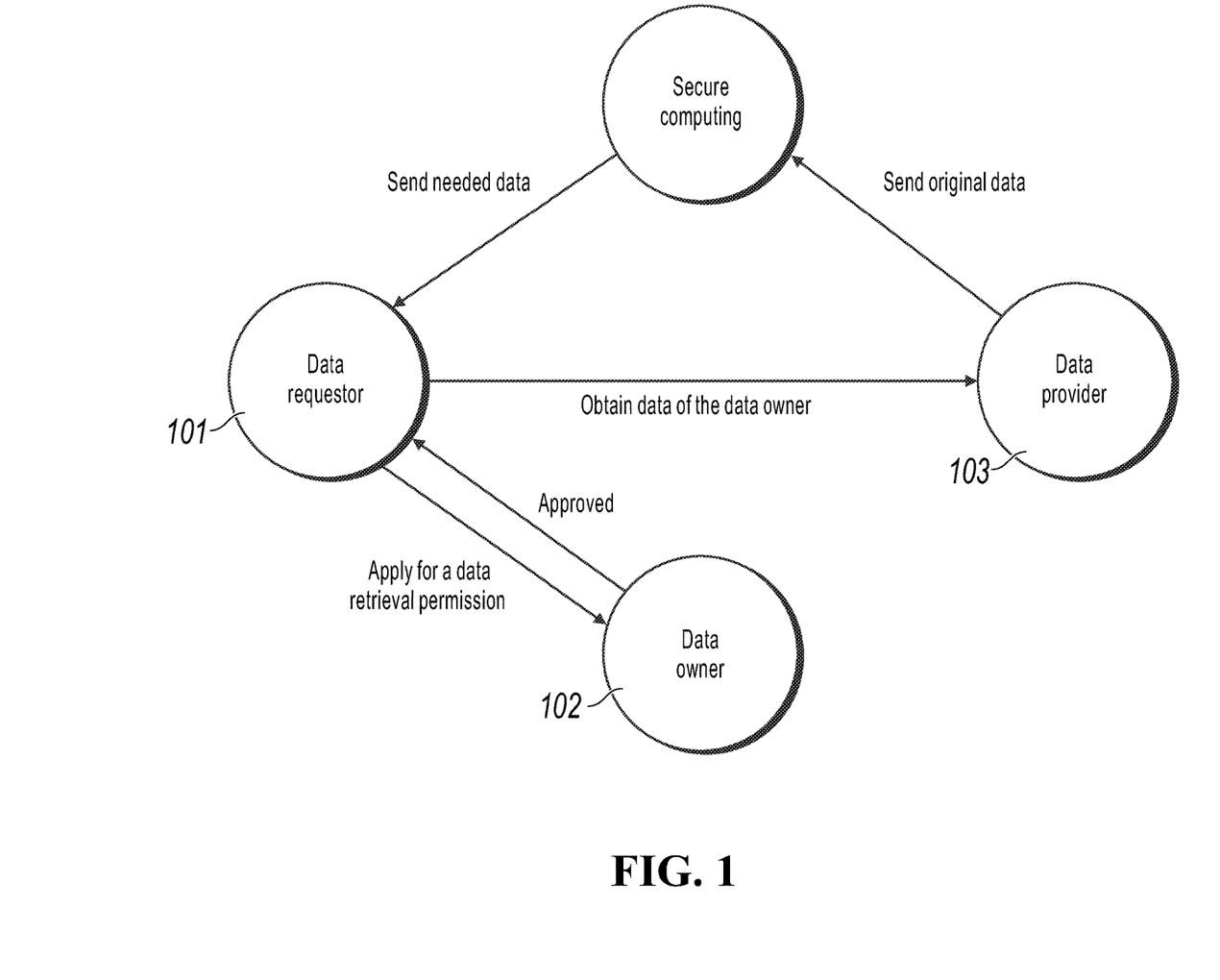
FIG. 1 is a schematic diagram illustrating an application background of an identity registration method, according to embodiments of the present specification.

To overcome the defects in the existing technology, the present solutions provide the following embodiments:

FIG. 1 is a schematic diagram illustrating an application background of an identity registration method, according to embodiments of the present specification. FIG. 1 includes three different identities: a data requestor 101, a data owner 102, and a data provider 103. The data requestor 101 needs to obtain data of the data owner 102 from the data provider 103. For example, the data requestor 101 obtains a salary statement of an individual from a bank, obtains real estate information of an individual from a real estate center, or obtains a credit report of an individual from a credit institution. Certainly, in addition to individual user information, obtained information can alternatively include enterprise user information. The enterprise user information is not enumerated here.

It is worthwhile to note that the salary statement, etc. are provided by the data provider 103, but the proof information is owned by a holder of a bank account of the salary statement. The data owner 102 can be understood as an individual user or an institution user, i.e., a user applying for a loan service. For example, a salary statement of Zhang San is sent by bank B, but the salary statement is owned by Zhang San. Therefore, Zhang San has the right to determine who can view the salary statement, but the bank does not have this right.

In the existing technology, the data owner 102 needs to obtain proof information from the data provider 103, and then send the proof information to the data requestor 101. In the present solutions, only communication between the data requestor 101 and the data provider 103 is needed, thereby reducing the number of information exchange times. In addition, in the present solutions, the data provider 103 does not need to perform a special operation such as digital signature, so that computing resources can also be saved.

In addition, it is worthwhile to note that, before obtaining the data provided by the data provider 103, the data requestor 101 needs to obtain data retrieval authorization information of the data owner 102.

Next, an identity registration method provided in the embodiments of the present specification is specifically described with reference to the accompanying drawings.

Figure 2:
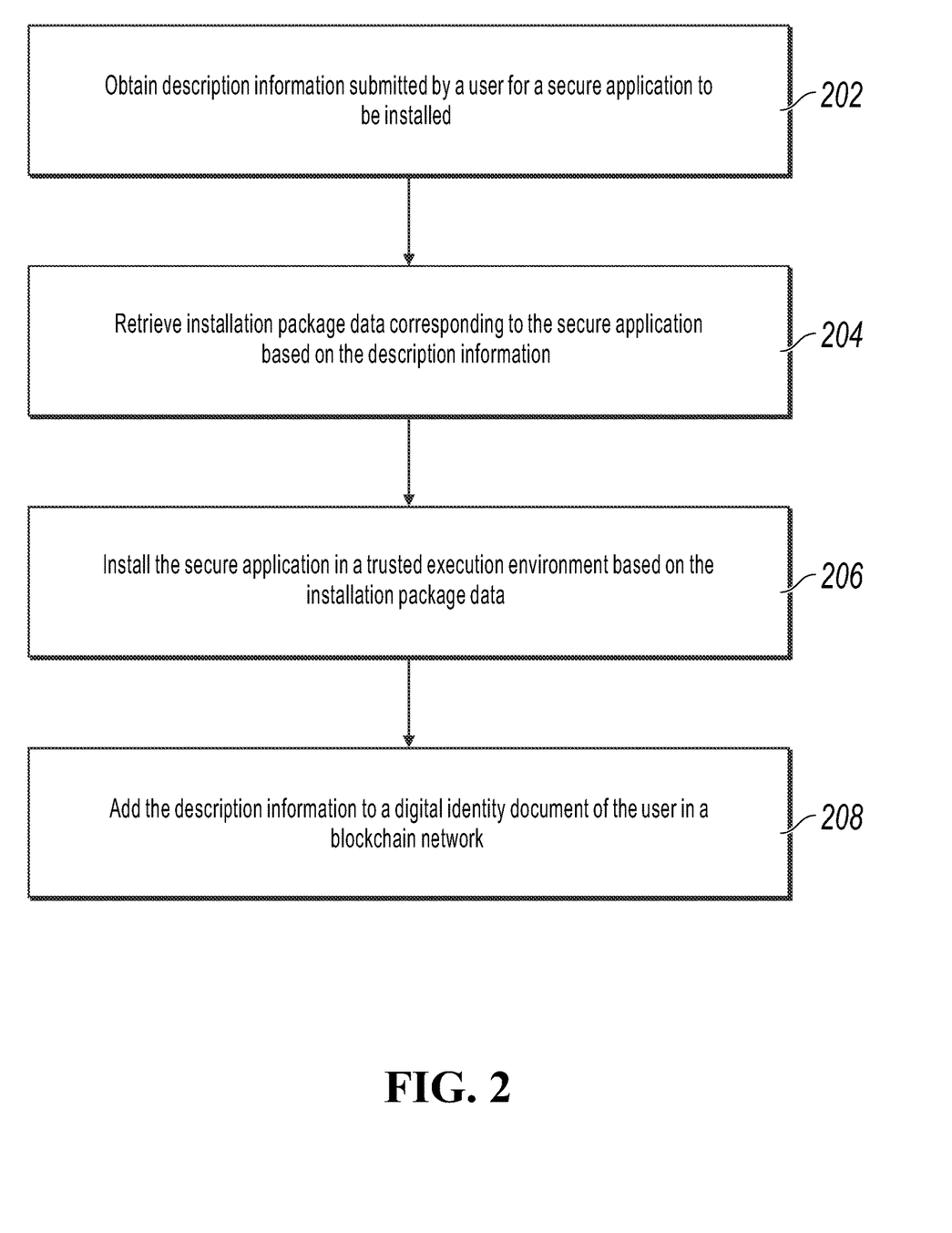
FIG. 2 is a schematic flowchart illustrating an identity registration method, according to embodiments of the present specification.

FIG. 2 is a schematic flowchart illustrating an identity registration method, according to embodiments of the present specification. From a program perspective, the process can be executed by a program mounted on an application server or an application client device. The solutions can be executed by a server of an identity registration platform, and the server can be a single device or multiple devices.

As shown in FIG. 2, the process can include the following steps.

Step 202: Obtain description information submitted by a user for a secure application to be installed, where the secure application is a program used to obtain trusted data.

It is worthwhile to note that the user can be an institution or organization, or can be an ordinary individual user. When the user is an institution or organization, the user can be an institution or organization that needs to obtain proof materials provided by an applicant, or can be a proxy service provider used to assist an ordinary individual user in identity registration. In addition, the user can be an account operator of an institution, an organization, or a proxy service provider.

When performing identity registration with a platform, the user further needs to install specific secure applications in addition to registering an account. These secure applications are related to a service demand of the user. The registered user can select a secure application that needs to be installed based on the service demand of the user.

The description information of the secure application can be a name, a type, a version number, function information, or digest information of the secure application. The purpose and function of the secure application can be determined by using the description information.

"Obtain trusted data" in "the secure application is a program used to obtain trusted data" can include both a trusted data source and trusted data transmission. The trusted data source can be understood as a trusted data acquisition method, and the trusted data transmission can be understood as performing the trusted data acquisition method in a trusted execution environment and the transmission cannot be tampered with or obtained by another person.

Step 204: Retrieve installation package data corresponding to the secure application based on the description information.

The installation package data can be stored in a trusted environment. The trusted environment can be a separate server or a code warehouse of the server, which storing installation packages of many secure applications. When the secure applications need to be retrieved, the secure applications can be retrieved from the server or the code warehouse of the server.

Step 206: Install the secure application in a trusted execution environment based on the installation package data.

In the present step, the secure application is installed in the trusted execution environment. The trusted execution environment can be a chip of a terminal of the registered user, a server of the platform, or an independent device. The device can communicate with the server of the registration platform. When the secure application is installed in an independent device, the terminal of the registered user can communicate with the device by using the server of the platform. In addition, after the installation, the terminal of the registered user can generate a program or an instruction for controlling operations of the secure application.

Optionally, the installing the secure application in a trusted execution environment can specifically include:

installing the secure application by using an interface predefined in code in the trusted execution environment, where the trusted execution environment is isolated from an operating system layer.

The secure application is installed in the trusted execution environment. For example, a secure execution environment can be implemented by using a TEE. The TEE is a secure extension based on CPU hardware and is completely isolated from the outside. Currently, the industry attaches great importance to TEE solutions. Almost all mainstream chip and software alliances have respective TEE solutions, such as a trusted platform module (TPM) in a software aspect, and Intel software guard extensions (SGX), an ARM Trustzone, and an AMD platform security processor (PSP) in a hardware aspect. The TEE can function as a hardware black box. Code and data executed in the TEE cannot be peered even by the operating system layer, and can be operated only by using an interface predefined in the code. In terms of efficiency, due to the black box nature of the TEE, instead of a complex cryptographic operation in homomorphic encryption, a plaintext data operation is performed in the TEE, so that calculation process efficiency is not lost. Therefore, through the TEE that is deployed on a blockchain node, a privacy demand in a blockchain scenario can be satisfied to a great extent under the premise of a relatively small performance loss.

Step 208: Add the description information to a digital identity document of the user in a blockchain network.

After installing the secure application, the registered user records the description information of the secure application, for other users to query. The other users can understand a service range of the user based on the description information. For example, if description information of a secure application records that digest information of the secure application is obtaining a salary statement of a bank card, other users can understand, based on the information, that a service range of the user includes obtaining a salary statement.

The platform can store the description information of the secure application in the blockchain network. A specific process can be implemented by connecting a proxy server to the blockchain network. In the blockchain network, a separate document, i.e., the digital identity document, stores identity information of the user. In this case, the description information of the secure applications can also be stored in the digital identity document.

The blockchain network is a new distributed infrastructure and computing method, where data is verified and stored by using a block chaining data structure, data is generated and updated by using a distributed node consensus algorithm, the security of data transmission and access is ensured by using cryptography, and data is programmed and operated by using a smart contract including automated script code. The blockchain network includes multiple nodes. When each node broadcasts information or a block to the blockchain network, all the nodes can receive the information or the block and verify the received block. When a ratio of the number of nodes that complete successful verification on the block to the total number of nodes in the entire blockchain network is greater than a predetermined threshold, it is determined that verification on the block is successfully completed by the blockchain network, and all the nodes receive the block and store the block in local node space. The node can be understood as an electronic device having a storage function, such as a server or a terminal. Blockchain networks mainly include a public chain, a consortium chain, and a private chain.

The digital identity document can be further used to store related information of a digital identity identifier. The document can include digital identity identifiers corresponding to devices, an identifier and a name of a database corresponding to each digital identity identifier, a key of a device corresponding to each digital identity identifier, any public certificate that an owner of identity information wants to disclose, a network address that can interact with the identity information, etc. The owner of the identity information can query or manage the digital identity document by obtaining a related private key. The distributed digital identity document is stored in the blockchain, and can be signed by using an asymmetric encryption algorithm. A private key is used for encryption, and a public key is needed for decryption verification.

It should be understood that, some steps of the method in the one or more embodiments of the present specification are interchangeable in terms of sequence based on an actual demand, or some steps of the method can be omitted or deleted.

In the method shown in FIG. 2, By restricting the applications used by registered users, the user can use only an application that satisfies a predetermined source channel to obtain data provided by a data provider and a secure application can run only in a trusted execution environment. Therefore, a secure data retrieval environment can be provided, to ensure that both data acquisition and data transmission are secure and trusted, thereby improving trustworthiness of obtained data content.

Based on the method in FIG. 2, embodiments of the present specification further provides some specific implementations of the method. The specific implementations are described below.

Optionally, before the obtaining description information submitted by a user for a secure application to be installed, the method can further include the following:

enterprise identity information submitted by the user is obtained;

the enterprise identity information is verified; and a user identity identifier is created for the user after the verification succeeds.

In this implementation, the platform further needs to generate the user identity identifier when the user registers with the platform, to identify the user. For example, if the user is an institution or organization, the user needs to submit the enterprise identity information during registration. The enterprise identity information can include one or more of an enterprise certificate number, an enterprise name, or a legal person name. The enterprise certificate number can be a registered number or a unified social credit code.

The enterprise identity information can be verified by using information published by a third-party authentication authority or an authority. Verification types can be authenticity and validity verification. The authenticity verification can be verifying whether multiple parts of the enterprise identity information are consistent, and the validity verification can be verifying whether the enterprise has an illegal act or a risky activity.

Certainly, the platform can further determine whether the user registers the platform for the first time. If the user does not register the platform for the first time, the platform notifies the user that there is a user identity identifier, and sends the identity identifier to the user.

Optionally, before the creating a user identity identifier for the user, the method can further include the following:

an information receiving address submitted by the user is obtained; and after the creating a user identity identifier for the user, the method can further include the following:

the digital identity document is generated, where the digital identity document includes the user identity identifier and the information receiving address.

When the user registers the platform, the user further needs to fill the information receiving address, to receive notification information sent by the platform. Then, the information receiving address information can also be stored in the digital identity document, and then the digital identity document can be stored in the blockchain network. This can be specifically implemented by using a proxy server.

Optionally, before the obtaining description information submitted by a user for a secure application to be installed, the method can further include the following:

Optionally, the secure application includes a data retrieval program and a data processing program, the data retrieval program is configured to obtain data based on a specified path, the data processing program is configured to process data based on a specified method, and the data processing program is configured to process data retrieved by using the data retrieval program.

A specific application scenario is used for description. If Wang applies to bank A for a loan and bank A needs a salary statement of Wang in bank B, when registering with the platform, bank A needs to install a corresponding secure application. If bank A needs original data of the salary statement of Wang in bank B, bank A needs to register and install a secure application for obtaining the original data of the salary statement from bank B. The secure application is only used to obtain data based on a specified path. Therefore, the secure application can be referred to as a data retrieval program. If bank A only needs to determine a salary income of Wang based on the salary statement of Wang in bank B, bank A only needs the salary income without obtaining the original data. Therefore, the service further requires bank A to install a data processing program, to process the obtained original data to obtain the salary income of Wang. It is worthwhile to note that there can be one, two, or more data processing programs.

It can be determined based on the previously described example that, if data needed by a data requestor is original data provided by a data provider, only a data retrieval program needs to be installed. If data needed by the data requestor is not the original data provided by the data provider, both a data retrieval program and a data processing program need to be installed.

a secure application query request submitted by the user is obtained;

a contract interface is invoked to query a secure application list; and the secure application list is sent to the user; and the obtaining description information submitted by a user for a secure application to be installed can specifically include:

obtaining description information of a secure application selected by the user from the secure application list.

This embodiment provides a method used by the user to select a secure application. Specifically, the user can select a secure application that the user needs to install based on the secure application list provided by the platform.

The user can determine the secure application that the user needs to install based on the service demand of the user. For example, if bank A needs a salary statement of Wang in bank B, bank A needs to install a secure application for obtaining original data from bank B. If bank A only needs to obtain a salary income determined based on the salary statement from bank B, bank A needs to install two secure applications: a secure application for obtaining the original data from bank B, and a secure application for processing the original data obtained from bank B to obtain the salary income.

It is worthwhile to note that the user can run multiple services, and therefore can install multiple secure applications. For example, bank A can further obtain a financial status of enterprise C in a financial institution.

In addition, in the steps of "invoking a contract interface to query a secure application list; and sending the secure application list to the user", the platform can send all secure applications to the registered user, or provide a corresponding selection method. For example, the platform can predict a secure application that the registered user may need based on a type of the registered user, or can selectively push a secure application based on a security level or a user level of the registered user. For a higher security level or a higher user level, the platform can push more data of secure applications to the user, thereby improving user experience.

Figure 3:
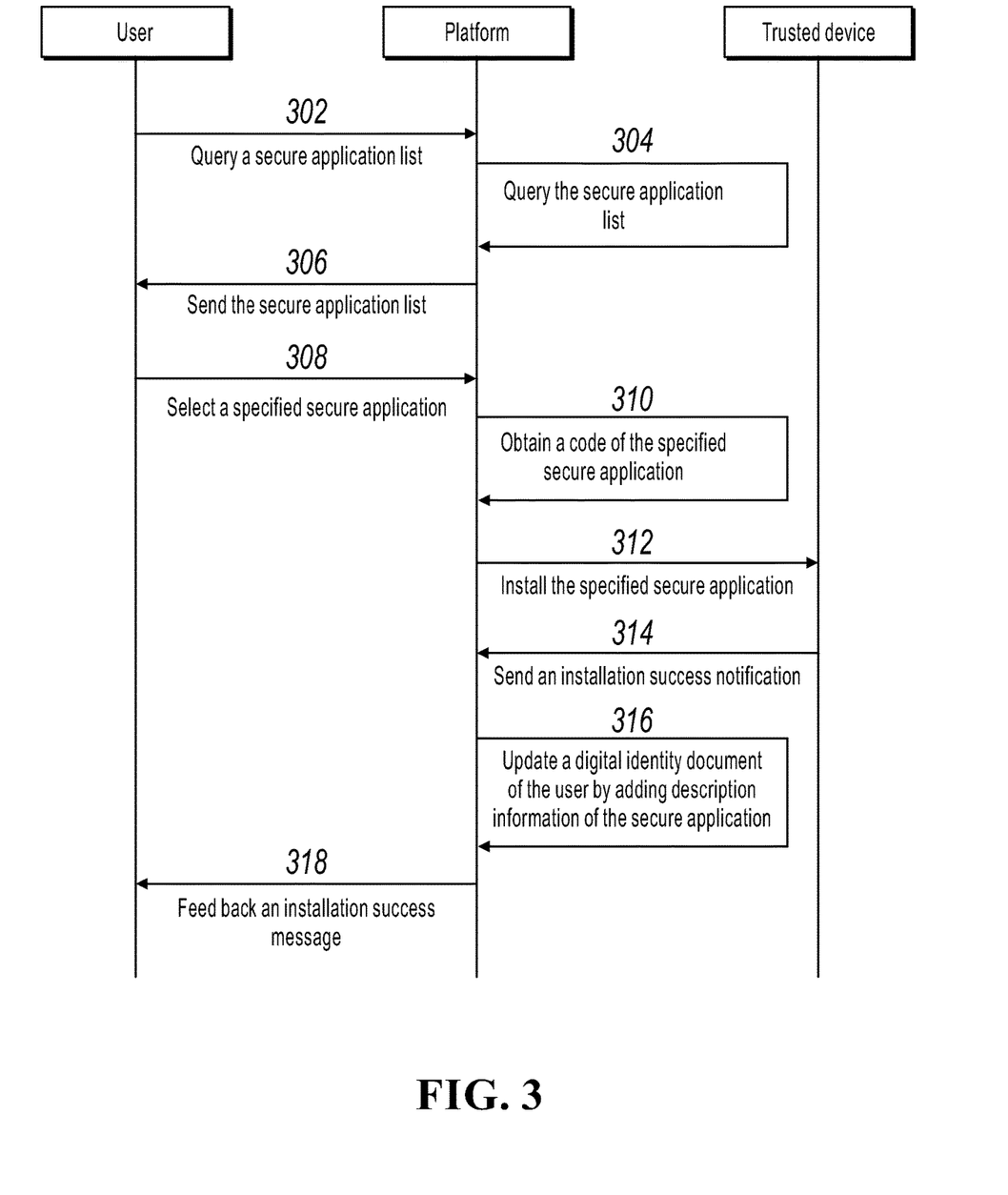
FIG. 3 is a schematic flowchart illustrating another identity registration method, according to embodiments of the present specification.

FIG. 3 is a schematic flowchart illustrating another identity registration method, according to embodiments of the present specification. As shown in FIG. 3, the method includes the following steps.

Step 302: A user queries a secure application list.

Step 304: A platform queries the secure application list.

Step 306: The platform sends the secure application list to the user.

Step 308: The user selects a specified secure application.

Step 310: The platform obtains a code of the specified secure application.

Step 312: The platform installs the specified secure application in a trusted device.

Step 314: The trusted device sends an installation success notification to the platform.

Step 316: The platform updates a digital identity document of the user by adding description information of the secure application.

Step 318: The platform feeds back secure application installation success information to the user.

Optionally, the method can further include the following:

a data acquisition request submitted by the user for first data is obtained, where the data acquisition request includes description information of the first data;

a secure application corresponding to the data acquisition request is determined;

the secure application is run in a trusted execution environment, where the secure application is used to obtain the first data; and the first data obtained by running the secure application is sent to a terminal of the user.

After installing the secure application, the user can apply for obtaining data. If the user needs to obtain the first data, the first data can be original data, or can be data obtained after the original data is processed.

The platform analyzes the first data to determine the secure application that needs to be run for obtaining the first data, and then can further determine whether the user installs the secure application. In addition, the first data can be obtained by more than one secure application. There can be multiple secure applications with the same function, and the user can select one or more of the multiple secure applications.

The description information of the first data can be in the following form: "salary statement of Wang in bank B".

Furthermore, in addition to the description information of the first data that needs to be obtained, the data acquisition request submitted by the user can further include description information of a secure application used when the first data is obtained, and then the platform determines whether the secure application is trusted, i.e., whether the secure application is a specified program used to obtain "salary statement of Wang in bank B". If yes, the platform controls to start the secure application to obtain data.

After the secure application is performed, the secure application sends the obtained data to the terminal of the user. Alternatively, the platform forwards the obtained data on behalf of the secure application. To improve security, the obtained data can be encrypted by using a public key of the user.

Optionally, the determining a secure application corresponding to the data acquisition request can specifically include:

determining whether the first data is original data that can be provided by a data provider, to obtain a determining result; and determining a first secure application used to retrieve the first data when the determining result is yes, where the first secure application is a data retrieval program.

Determining a type of the secure application is related to a type of the first data, and the type can be bank data, credit data, real estate data, etc. In addition, the type of the secure application can also be related to whether the first data is the original data provided by the data provider. If the first data is the original data, only one secure application, i.e., a data retrieval program, is needed.

Optionally, the determining a first secure application used to retrieve the first data specifically includes:

determining the data provider of the first data;

determining acquisition path information of the first data based on a registered communication address of the data provider; and determining the first secure application based on the acquisition path information.

When the data retrieval program is determined, information of the data provider can be first determined. If salary statement information of Wang in bank B needs to be obtained, a registered communication address of bank B or a data acquisition interface needs to be determined. Generally, both the communication address and the data acquisition interface are public. The purpose of the secure application can be determined based on the information.

In addition, the acquisition path information of the first data can be further determined based on the registered communication address. For example, the acquisition path information is an acquisition source and a sending destination of the first data. Therefore, the secure application for obtaining the first data, i.e., the first secure application, can be determined based on the acquisition path information.

It is worthwhile to note that "first" is used to distinguish between nouns and does not have a specific meaning. In addition, there can be one, two, or more first secure applications.

Optionally, the method can further include the following:

the original data corresponding to the first data is determined when the determining result is no;

a second secure application used to obtain the original data is determined, where the second secure application is a data retrieval program;

a processing operation for the original data is determined based on the first data and the original data; and a third secure application used to perform the processing operation is determined, where the third secure application is a data processing program.

If the first data is not the original data, two secure applications, i.e., a data retrieval program and a data processing program, are needed.

If the first data is not the original data, for example, a salary income of Wang, a method for determining the salary income is analyzing a salary card flow of Wang to determine the salary income. In this case, when the first data is obtained, the original data corresponding to the first data needs to be first determined, and then processing performed on the original data to obtain the first data needs to be determined, to ensure that a data acquisition process and a data processing process are correct and reasonable.

A method for determining the second secure application is the same as the method for determining the first secure application, and details are omitted here for simplicity. For a method for determining the third secure application, a reasonable processing process can be determined based on a change from the original data to the first data, and the third secure application need to implement only this processing process.

It is worthwhile to note that there can be multiple processing processes from the original data to the first data. Therefore, multiple third secure applications can correspond to the processing processes.

The first data can be a result calculated based on the original data, or can be a part of the original data. For example, if the original data is real estate certificate information, the first data that the user needs to obtain is certain information in the real estate certificate information, such as a real estate area or a specific real estate location. For ease of operation, the real estate center centrally provides specific real estate information. Therefore, the original data can be processed after all the information is retrieved. In this case, a data retrieval program and a data processing program are still needed.

When the obtained first data is not the original data, only a part of the information can be granted to a related institution for retrieval while the original data or the other data can be hidden. Therefore, privacy data can be better protected.

Optionally, the running the secure application in the trusted execution environment can specifically include:

running the second secure application in the trusted execution environment;

obtaining the original data obtained by the second secure application; and inputting the original data to the third secure application for processing in the trusted execution environment.

This implementation specifically describes a running status of the secure applications for obtaining the first data. First, the second secure application, i.e., a data retrieval program, is run to obtain the original data, and then the original data obtained by the second secure application is directly input to the third secure application for processing. The original data is not stored in a device of any party, so that privacy data can be protected. In addition, the entire process runs in the trusted execution environment, so that trusted data can be obtained.

Optionally, the second secure application is specified by a data owner of the original data, and the third secure application is specified by the user.

The first secure application and the second secure application are data retrieval programs, and obtain data of the data owner from the data provider. Therefore, the data retrieval programs can be specified by the data owner to ensure that the data retrieval programs for retrieving data are programs trusted by the data owner.

The third secure application is a data processing program, and is closely related to data needed by a service of the data requestor. Therefore, the third secure application can be specified by the data requestor, for example, the data requestor determines whether the third secure application is trusted. To satisfy this demand, before applying for obtaining the first data, the data requestor can further request the data owner to perform permission approval. When applying for permission, the data requestor can note a specific data retrieval program used by the data requestor. If the data owner considers that the data retrieval program is trusted, the data owner can approve the data acquisition permission application of the data requestor. If the data owner considers that the data retrieval program cannot be trusted, the data owner can disapprove of the permission approval application. In addition, when disapproving of the permission approval application, the data owner can further recommend a specific data processing program that can be used to obtain permission approval to the data requestor.

In addition, in another case, a data retrieval program submitted by the data requestor represents that data obtained by the data retrieval program is different from data that the data owner agrees to provide. For example, the data requestor needs M and N data in real estate data of the data owner, but the data owner agrees to grant only a retrieval permission for the M data without granting a retrieval permission for the N data. In this case, the data owner can reject the permission approval request of the data requestor.

Figure 4:
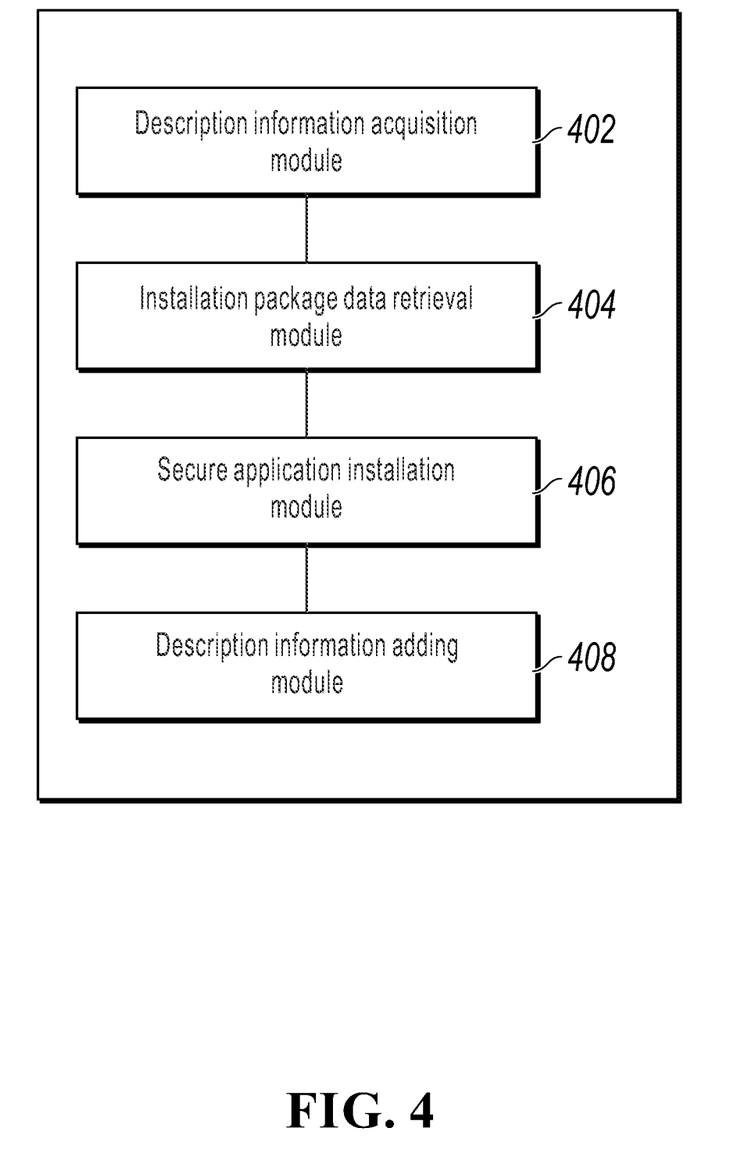
FIG. 4 is a schematic structural diagram illustrating an identity registration apparatus corresponding to FIG. 2, according to embodiments of the present specification.

Based on the same idea, embodiments of the present specification further provides an apparatus corresponding to the method. FIG. 4 is a schematic structural diagram illustrating an identity registration apparatus corresponding to FIG. 2, according to embodiments of the present specification. As shown in FIG. 4, the apparatus can include:

a description information acquisition module 402, configured to obtain description information submitted by a user for a secure application to be installed, where the secure application is a program used to obtain trusted data;

an installation package data retrieval module 404, configured to retrieve installation package data corresponding to the secure application based on the description information;

a secure application installation module 406, configured to install the secure application in a trusted execution environment based on the installation package data; and a description information adding module 408, configured to add the description information to a digital identity document of the user in a blockchain network.

In the apparatus shown in FIG. 4, By restricting the applications used by registered users, the user can use only an application that satisfies a predetermined source channel to obtain data provided by a data provider and a secure application can run only in a trusted execution environment. Therefore, a secure data retrieval environment can be provided, to ensure that both data acquisition and data transmission are secure and trusted, thereby improving trustworthiness of obtained data content.

Based on the apparatus in FIG. 4, embodiments of the present specification further provides some specific implementations of the apparatus. The specific implementations are described below.

Optionally, the apparatus can further include:

an enterprise identity information acquisition module, configured to obtain enterprise identity information submitted by the user;

an enterprise identity information verification module, configured to verify the enterprise identity information; and a user identity identifier creation module, configured to create a user identity identifier for the user after the verification succeeds.

Optionally, the apparatus can further include:

an information receiving address acquisition module, configured to obtain an information receiving address submitted by the user; and a digital identity document generation module, configured to generate the digital identity document, where the digital identity document includes the user identity identifier and the information receiving address.

Optionally, the apparatus can further include:

a secure application query request acquisition module, configured to obtain a secure application query request submitted by the user;

a secure application list query module, configured to invoke a contract interface to query a secure application list; and a secure application list sending module, configured to send the secure application list to the user; and the description information acquisition module 402 is specifically configured to obtain description information of a secure application selected by the user from the secure application list.

Optionally, the secure application includes a data retrieval program and a data processing program, the data retrieval program is configured to obtain data based on a specified path, the data processing program is configured to process data based on a specified method, and the data processing program is configured to process data retrieved by using the data retrieval program.

Optionally, the apparatus can further include:

a data acquisition request acquisition module, configured to obtain a data acquisition request submitted by the user for first data;

a secure application determining module, configured to determine a secure application corresponding to the data acquisition request;

a secure application running module, configured to run the secure application in the trusted execution environment; and a first data sending module, configured to send the first data obtained by running the secure application to a terminal of the user.

Optionally, the secure application determining module can specifically include:

a determining unit, configured to determine whether the first data is original data that can be provided by a data provider, to obtain a determining result; and a first secure application determining unit, configured to determine a first secure application used to retrieve the first data when the determining result is yes, where the first secure application is a data retrieval program.

Optionally, the first secure application determining unit can specifically include:

a data provider determining subunit, configured to determine the data provider of the first data;

an acquisition path information determining subunit, configured to determine acquisition path information of the first data based on a registered communication address of the data provider; and a first secure application determining subunit, configured to determine the first secure application based on the acquisition path information.

Optionally, the secure application determining module can further include:

an original data determining unit, configured to determine the original data corresponding to the first data when the determining result is no;

a second secure application determining unit, configured to determine a second secure application used to obtain the original data, where the second secure application is a data retrieval program;

a processing operation determining unit, configured to determine a processing operation for the original data based on the first data and the original data; and a third secure application determining unit, configured to determine a third secure application used to perform the processing operation, where the third secure application is a data processing program.

Optionally, the secure application running module can specifically include:

a second secure application running unit, configured to run the second secure application in the trusted execution environment;

an original data acquisition unit, configured to obtain the original data obtained by the second secure application; and an original data input unit, configured to input the original data to the third secure application for processing in the trusted execution environment.

Optionally, the second secure application is specified by a data owner of the original data, and the third secure application is specified by the user.

Optionally, the installing the secure application in a trusted execution environment can specifically include:

installing the secure application by using an interface predefined in code in the trusted execution environment, where the trusted execution environment is isolated from an operating system layer.

Based on the same idea, embodiments of the present specification further provides a device corresponding to the method.

Figure 5:
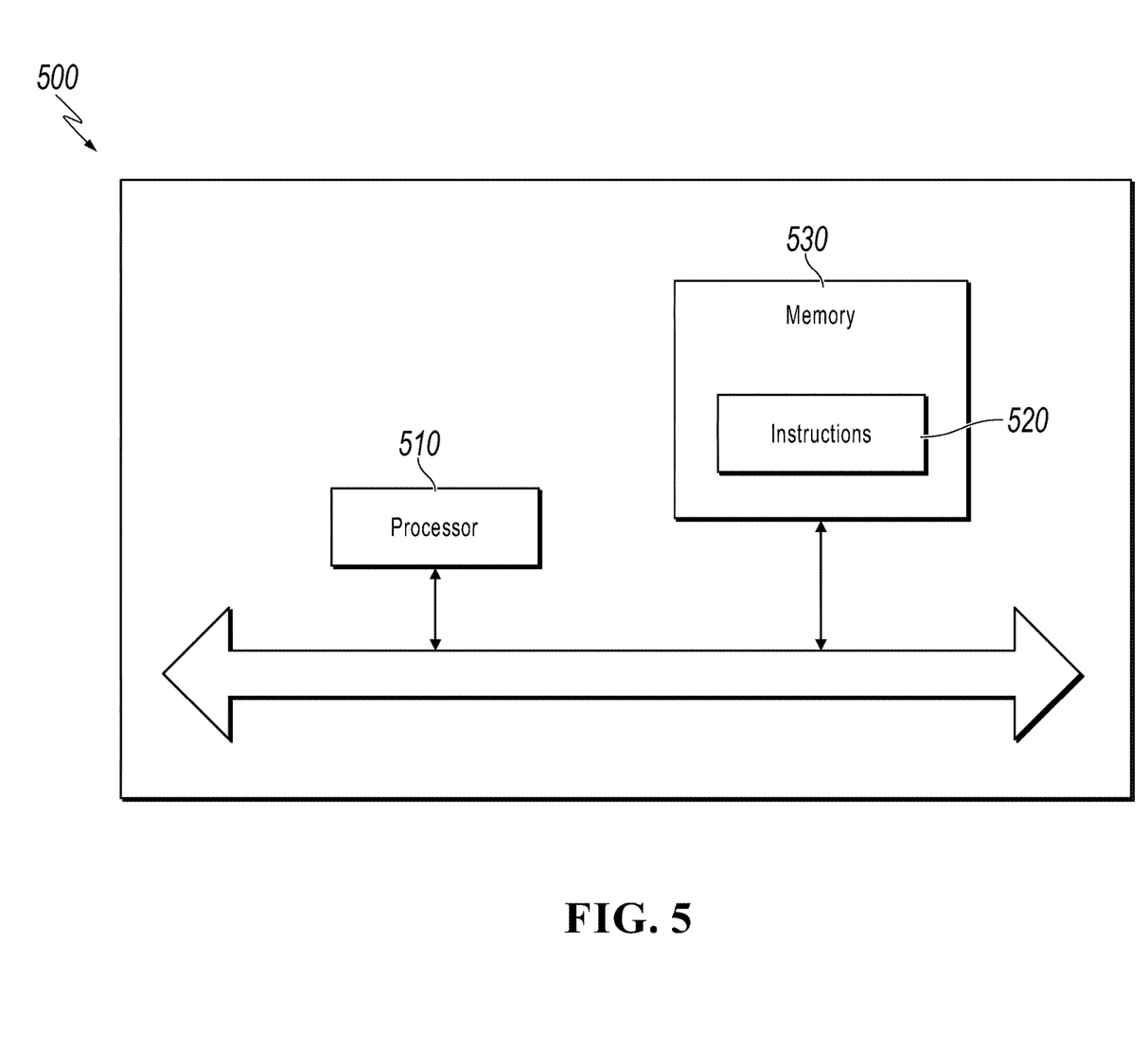
FIG. 5 is a schematic structural diagram illustrating an identity registration device corresponding to FIG. 2, according to embodiments of the present specification.

FIG. 5 is a schematic structural diagram illustrating an identity registration device corresponding to FIG. 2, according to embodiments of the present specification. As shown in FIG. 5, a device 500 can include:

at least one processor 510; and a memory 530 communicably coupled to the at least one processor.

The memory 530 stores instructions 520 that can be executed by the at least one processor 510, and the instructions 520 are executed by at least one processor 510 to enable the at least one processor 510 to:

obtain description information submitted by a user for a secure application to be installed, where the secure application is a program used to obtain trusted data;

retrieve installation package data corresponding to the secure application based on the description information;

install the secure application in a trusted execution environment based on the installation package data; and add the description information to a digital identity document of the user in a blockchain network.

In the device shown in FIG. 5, By restricting the applications used by registered users, the user can use only an application that satisfies a predetermined source channel to obtain data provided by a data provider and a secure application can run only in a trusted execution environment. Therefore, a secure data retrieval environment can be provided, to ensure that both data acquisition and data transmission are secure and trusted, thereby improving trustworthiness of obtained data content.

Based on the same idea, embodiments of the present specification further provides a computer-readable medium corresponding to the previously described method. The computer-readable medium stores computer-readable instructions, and the computer-readable instructions can be executed by a processor to implement the following method:

obtaining description information submitted by a user for a secure application to be installed, where the secure application is a program used to obtain trusted data;

retrieving installation package data corresponding to the secure application based on the description information;

installing the secure application in a trusted execution environment based on the installation package data; and adding the description information to a digital identity document of the user in a blockchain network.

The embodiments of the present specification are described in a progressive way. For same or similar parts of the embodiments, mutual references can be made to the embodiments. Each embodiment focuses on a difference from other embodiments. Especially, the identity registration device shown in FIG. 5 is basically similar to the method embodiment, and therefore is described briefly. For related parts, references can be made to some descriptions in the method embodiment.

In the 1990s, whether a technical improvement is a hardware improvement (for example, an improvement to circuit structures, such as a diode, a transistor, or a switch) or a software improvement (an improvement to a method procedure) can be clearly distinguished. However, as technologies develop, current improvements to many method procedures can be considered as direct improvements to hardware circuit structures. Almost all designers program an improved method process into a hardware circuit, to obtain a corresponding hardware circuit structure. Therefore, a method process can be implemented by using a hardware entity module. For example, a programmable logic device (PLD) (for example, a field programmable gate array (FPGA)) is such an integrated circuit, and a logical function of the PLD is determined by a user through device programming. A designer performs programming to "integrate" a digital system to a single PLD, without requiring a chip manufacturer to design and manufacture a dedicated integrated circuit chip. In addition, at present, instead of manually manufacturing an integrated circuit chip, this type of programming is mostly implemented by using "logic compiler" software. The "logic compiler" software is similar to a software compiler used to develop and write a program. Original code needs to be written in a particular programming language before compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCa1, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used at present. A person skilled in the art should also understand that a hardware circuit that implements a logical method procedure can be readily obtained provided that the method procedure is logically programmed by using several of the previously described HDLs and is programmed into an integrated circuit.

A controller can be implemented by using any appropriate method. For example, the controller can be in a form of microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of the memory. A person skilled in the art should also know that, in addition to implementing the controller by using only the computer-readable program code, method steps can be logically programmed to allow the controller to implement the same function in a form of the logic gate, the switch, the ASIC, the programmable logic controller, or the built-in microcontroller. Therefore, the controller can be considered as a hardware component, and an apparatus included in the controller to implement various functions can also be considered as a structure in the hardware component. Alternatively, the apparatus for implementing various functions can even be considered as both a software module for implementing the method and a structure in the hardware component.

The system, apparatus, module, or unit illustrated in the previously described embodiments can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or any device combination of these devices.

For ease of description, when the apparatus is described, the apparatus is divided into various units based on functions for separate description. Certainly, when the present application is implemented, functions of the units can be implemented in one or more pieces of software and/or hardware.

A person skilled in the art should understand that the embodiments of the present invention each can be provided as a method, a system, or a computer program product. Therefore, the present invention can use a form of hardware only embodiments, software only embodiments, or embodiments with a combination of software and hardware. Moreover, the present invention can use a form of a computer program product implemented on one or more computer-usable storage media (including but not limited to a magnetic disk memory, a CD-ROM, an optical memory, etc.) that include computer-usable program code.

The present invention is described with reference to the flowcharts and/or block diagrams of the method, the device (system), and the computer program product according to the embodiments of the present invention. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

Alternatively, these computer program instructions can be stored in a computer-readable memory that can instruct a computer or another programmable data processing device to work in a specific way, so that the instructions stored in the computer-readable memory can be used to make an apparatus that includes the instructions. The instruction apparatus implements a specific function in one or more processes in the flowcharts and/or in one or more blocks in the block diagrams.

Alternatively, these computer program instructions can be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computing device includes one or more processors (CPUs), input/output interfaces, network interfaces, and memories.

The memory may include a non-persistent memory, a random access memory (RAM), a nonvolatile memory, and/or another form in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase-change random access memory (PRAM), a static random access memory (SRAM), a dynamic random access memory (DRAM) or another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape/magnetic disk memory or another magnetic storage device, or any other non-transmission medium. The computer storage medium can be configured to store information accessible to a computing device. Based on the definition in the present specification, the computer-readable medium does not include computer-readable transitory media (transitory media) such as a modulated data signal and carrier.

It is worthwhile to further note that, the terms "include", "comprise", or their any other variants are intended to cover a non-exclusive inclusion, so that a process, a method, a product, or a device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that the embodiments of the present application each can be provided as a method, a system, or a computer program product. Therefore, the present application can use a form of hardware only embodiments, software only embodiments, or embodiments with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. for executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The previous descriptions are merely embodiments of the present application, and are not intended to limit the present application. A person skilled in the art can make various modifications and changes to the present application. Any modification, equivalent replacement, improvement, etc. made without departing from the spirit and principle of the present application shall fall within the scope of the claims of the present application.

What is claimed is:

1. A computer-implemented method for identity registration, comprising:
   obtaining, from a terminal device, a data acquisition request for target data owned by a data owner and stored by a data provider;
   determining a first data retrieving application to be installed in a trusted execution environment (TEE) of the terminal device to retrieve the target data from the data provider, wherein the first data retrieving application is determined by invoking an interface of a smart contract to query a secure application list;
   sending the secure application list to the terminal device;
   obtaining description information for the first data retrieving application;
   retrieving installation package data corresponding to the first data retrieving application based on the description information for the first data retrieving application;
   installing the first data retrieving application in the TEE of the terminal device based on the installation package data;
   adding the description information for the first data retrieving application to a digital identity document of the terminal device recorded on a blockchain; and
   executing the first data retrieving application in the TEE to retrieve the target data from the data provider.

2. The computer-implemented method of claim 1, comprising:
   identifying enterprise identity information from the terminal device;
   verifying the enterprise identity information; and
   generating a user identifier for a user after the enterprise identity information is successfully verified.

3. The computer-implemented method of claim 2, comprising:
   identifying an information receiving address from the user; and
   after the user identifier is generated, generating the digital identity document, wherein the digital identity document comprises the user identifier and the information receiving address.

4. The computer-implemented method of claim 1, comprising:
   sending the target data to the terminal device.

5. The computer-implemented method of claim 1, wherein determining the first data retrieving application to retrieve the target data comprises:
   determining whether the target data is original data owned by the data owner; and
   in response to determining that the target data is the original data:
      determining the data provider of the original data;
      determining acquisition path information of the original data based on a registered communication address of the data provider; and
      determining the first data retrieving application based on the acquisition path information.

6. The computer-implemented method of claim 1, comprising:
   determining whether the target data is original data owned by the data owner; and
   in response to determining that the target data is not the original data:
      determining the original data corresponding to the target data;
      determining a second data retrieving application selected by the data owner to retrieve the original data;
      determining a processing operation for the original data based on the target data and the original data; and
      determining a data processing program selected by a user to perform the processing operation.

7. The computer-implemented method of claim 6, wherein executing the first data retrieving application in the TEE comprises:
- executing the second data retrieving application in the TEE;
- identifying the original data based on executing the second data retrieving application; and
- inputting the original data to the data processing program in the TEE.

8. A non-transitory, computer-readable medium storing one or more instructions executable by a computer system to perform operations comprising:
- obtaining, from a terminal device, a data acquisition request for target data owned by a data owner and stored by a data provider;
- determining a first data retrieving application to be installed in a trusted execution environment (TEE) of the terminal device to retrieve the target data from the data provider, wherein the first data retrieving application is determined by invoking an interface of a smart contract to query a secure application list;
- sending the secure application list to the terminal device;
- obtaining description information for the first data retrieving application;
- retrieving installation package data corresponding to the first data retrieving application based on the description information for the first data retrieving application;
- installing the first data retrieving application in the TEE of the terminal device based on the installation package data;
- adding the description information for the first data retrieving application to a digital identity document of the terminal device recorded on a blockchain; and
- executing the first data retrieving application in the TEE to retrieve the target data from the data provider.

9. The non-transitory, computer-readable medium of claim 8, the operations comprise:
- identifying enterprise identity information from the terminal device;
- verifying the enterprise identity information; and
- generating a user identifier for a user after the enterprise identity information is successfully verified.

10. The non-transitory, computer-readable medium of claim 9, the operations comprise:
- identifying an information receiving address from the user; and
- after the user identifier is generated, generating the digital identity document, wherein the digital identity document comprises the user identifier and the information receiving address.

11. The non-transitory, computer-readable medium of claim 8, the operations comprise:
- sending the target data to the terminal device.

12. The non-transitory, computer-readable medium of claim 8, wherein determining the first data retrieving application to retrieve the target data comprises:
- determining whether the target data is original data owned by the data owner; and
- in response to determining that the target data is the original data:
    - determining the data provider of the original data;
    - determining acquisition path information of the original data based on a registered communication address of the data provider; and
    - determining the first data retrieving application based on the acquisition path information.

13. The non-transitory, computer-readable medium of claim 8, the operations comprise:
- determining whether the target data is original data owned by the data owner; and
- in response to determining that the target data is not the original data:
    - determining the original data corresponding to the target data;
    - determining a second data retrieving application selected by the data owner to retrieve the original data;
    - determining a processing operation for the original data based on the target data and the original data; and
    - determining a data processing program selected by a user to perform the processing operation.

14. The non-transitory, computer-readable medium of claim 13, wherein executing the first data retrieving application in the TEE comprises:
- executing the second data retrieving application in the TEE;
- identifying the original data based on executing the second data retrieving application; and
- inputting the original data to the data processing program in the TEE.

15. A computer-implemented system, comprising:
- one or more computers; and
- one or more computer memory devices interoperably coupled with the one or more computers and having tangible, non-transitory, machine-readable media storing one or more instructions that, when executed by the one or more computers, perform operations comprising:
    - obtaining, from a terminal device, a data acquisition request for target data owned by a data owner and stored by a data provider;
    - determining a first data retrieving application to be installed in a trusted execution environment (TEE) of the terminal device to retrieve the target data from the data provider, wherein the first data retrieving application is determined by invoking an interface of a smart contract to query a secure application list;
    - sending the secure application list to the terminal device;
    - obtaining description information for the first data retrieving application;
    - retrieving installation package data corresponding to the first data retrieving application based on the description information for the first data retrieving application;
    - installing the first data retrieving application in the environment TEE of the terminal device based on the installation package data;
    - adding the description information for the first data retrieving application to a digital identity document of the terminal device recorded on a blockchain; and
    - executing the first data retrieving application in the TEE to retrieve the target data from the data provider.

16. The computer-implemented system of claim 15, the operations comprise:
- identifying enterprise identity information from the terminal device;
- verifying the enterprise identity information; and
- generating a user identifier for a user after the enterprise identity information is successfully verified.

17. The computer-implemented system of claim 16, the operations comprise:
- identifying an information receiving address from the user; and
- after the user identifier is generated, generating the digital identity document, wherein the digital identity document comprises the user identifier and the information receiving address.

* * * * *

UNITED STATES PATENT AND TRADEMARK OFFICE
CERTIFICATE OF CORRECTION

PATENT NO. : 11,614,929 B2
APPLICATION NO. : 17/359069
DATED : March 28, 2023
INVENTOR(S) : Yuan Chen et al.

It is certified that error appears in the above-identified patent and that said Letters Patent is hereby corrected as shown below:

In the Claims

In Claim 15, Line 46, delete "environment TEE" and insert -- TEE --, therefor.

Signed and Sealed this
Twenty-third Day of May, 2023

Katherine Kelly Vidal
*Director of the United States Patent and Trademark Office*